(12) United States Patent  (10) Patent No.: US 8,955,203 B2
Tardif  (45) Date of Patent: Feb. 17, 2015

(54) SAFETY CARABINER

(75) Inventor: Sebastien Tardif, Saint Nazaire (FR)

(73) Assignee: Wichard (FR)

( * ) Notice: Subject to any disclaimer, the term of this patent is extended or adjusted under 35 U.S.C. 154(b) by 254 days.

(21) Appl. No.: 13/523,240

(22) Filed: Jun. 14, 2012

(65) Prior Publication Data

US 2012/0317761 A1    Dec. 20, 2012

(30) Foreign Application Priority Data

Jun. 16, 2011   (FR) ...................................... 11 55267

(51) Int. Cl.
*A44B 13/00*   (2006.01)
*F16B 45/02*   (2006.01)

(52) U.S. Cl.
CPC ...................... *F16B 45/02* (2013.01)
USPC ...................................................... 24/599.5

(58) Field of Classification Search
CPC .................................. F16B 45/02; B66C 11/36
USPC ....................... 24/599.5, 599.9, 600.1, 601.1; 294/82.19, 82.2–82.23
See application file for complete search history.

(56) References Cited

U.S. PATENT DOCUMENTS

| | | | | |
|---|---|---|---|---|
| 1,626,866 A | * | 5/1927 | Neilson | 294/82.2 |
| 4,122,585 A | * | 10/1978 | Sharp et al. | 294/82.2 |
| 5,257,441 A | * | 11/1993 | Barlow | 24/599.5 |
| 5,608,953 A | * | 3/1997 | Petzl et al. | 24/588.1 |
| 5,791,025 A | * | 8/1998 | Maurice et al. | 24/582.11 |
| 5,864,929 A | * | 2/1999 | Sakong | 24/600.1 |
| 5,927,431 A | * | 7/1999 | Klein, Jr. | 182/3 |
| 8,001,663 B2 | * | 8/2011 | Belcourt et al. | 24/599.5 |
| 8,245,369 B2 | * | 8/2012 | Hortnagl | 24/599.6 |
| 8,544,155 B2 | * | 10/2013 | Lin | 24/600.1 |
| 2003/0106190 A1 | * | 6/2003 | Christianson | 24/600.1 |
| 2003/0167608 A1 | | 9/2003 | Petzl et al. | |
| 2007/0186393 A1 | * | 8/2007 | Thompson | 24/599.9 |
| 2009/0056088 A1 | * | 3/2009 | Petzl et al. | 24/599.9 |
| 2010/0269314 A1 | * | 10/2010 | Petzl et al. | 24/591.1 |
| 2012/0210542 A1 | * | 8/2012 | Yang | 24/369 |
| 2012/0324684 A1 | * | 12/2012 | Codega | 24/599.4 |
| 2013/0160252 A1 | * | 6/2013 | Lin | 24/601.5 |

FOREIGN PATENT DOCUMENTS

DE      4237263 A1   7/1994

* cited by examiner

*Primary Examiner* — Victor Batson
*Assistant Examiner* — Matthew Sullivan
(74) *Attorney, Agent, or Firm* — Cantor Colburn LLP (57) ABSTRACT

The carabiner includes a body delimiting a basic frame, a closing finger pivotably mounted on the body between closed and open positions of the basic frame, locking means movably mounted on the closing finger between locked and unlocked positions of the closing finger, and actuating means arranged to move the locking means between the locked and unlocked positions thereof, where the actuating means include a handling member connected to the locking means and movably mounted on a portion of the carabiner body opposite the closing finger, between a first position in which the locking means are in the locked position and a second position in which the locking means are in the unlocked position, the handling member being arranged so that moving the latter between the first and second positions thereof causes the locking means to move between the locked and unlocked positions thereof.

13 Claims, 6 Drawing Sheets

SAFETY CARABINER

TECHNICAL FIELD

The present invention relates to a safety carabiner used, inter alia, for climbing, speleology, and water sports, such as sailing, or as a safety measure protecting people working at heights from falling.

BRIEF DISCUSSION OR RELATED ART

Document DE 42 37 263 describes a safety carabiner including:
- a body delimiting an open loop and including first and second ends,
- a closing finger pivotably mounted around a hinge pin situated at the first end of the body, between a closed position in which the closing finger cooperates with the second end of the body so as to close the loop, and an open position in which the closing finger is tilted toward the inside of the carabiner,
- locking means movably mounted on the closing finger between a locked position in which the locking means cooperate with the second end of the body of the carabiner so as to lock the closing finger in the closed position thereof, and an unlocked position in which the closing finger can be moved toward its open position, and
- actuating means arranged to move the locking means between the locked and unlocked positions thereof, the actuating means including a handling member connected to the locking means and movably mounted on the closing finger between a first position in which the locking means are in the locked position and a second position in which the locking means are in the unlocked position, the handling member being arranged so that moving the latter between the first and second positions thereof causes the locking means to move between their locked and unlocked positions.

Such a carabiner has several drawbacks resulting more particularly from the position of the handling member on the closing finger.

In fact, when a user seeks to remove the rope or strap positioned inside the carabiner, the latter often catches on the handling member.

Furthermore, such a position of the handling member makes it difficult to open the carabiner, since it is necessary to successively exert pressure on the handling member in a first direction so as to move the latter toward the second position thereof, and pressure on the closing finger in a second direction transverse to the first direction so as to move the closing finger toward the open position thereof. Such handling of the carabiner is awkward, particularly when it must be done with one hand or by a small user.

Moreover, such a position of the handling member can cause a risk of untimely unlocking of the closing finger, therefore a risk of opening thereof, for example when the handling member rubs against an outside element, such as part of the anchor or a rope.

BRIEF SUMMARY

The present invention aims to resolve these drawbacks.

The technical problem at the base of the invention therefore consists of providing a carabiner that has a simple and cost-effective structure, and that allows fast and easy opening of the carabiner.

To that end, the present invention relates to a safety carabiner including:
- a body at least partially delimiting a first basic frame intended to receive a fastening element, such as a safety line,
- a closing finger pivotably mounted on the body around a hinge pin, between a closed position in which the closing finger cooperates with the body so as to close the first basic frame, and an open position in which the closing finger is tilted toward the inside of the carabiner so as to make the first basic frame accessible,
- locking means movably mounted on the closing finger between a locked position in which the locking means cooperate with the body of the carabiner so as to lock the closing finger in its closed position, and an unlocked position in which the closing finger can be moved toward its open position, and
- actuating means arranged to move the locking means between the locked and unlocked positions thereof, the actuating means including a handling member connected to the locking means and movable between a first position in which the locking means are in the locked position and a second position in which the locking means are in the unlocked position, the handling member being arranged so that moving the latter between the first and second positions thereof causes the locking means to move between the locked and unlocked positions thereof, wherein the handling member is movably mounted on a portion of the body of the carabiner opposite the closing finger, between the first and second positions thereof.

Arranging the handling member on the body of the carabiner opposite the closing finger allows a user to open the carabiner using one hand, by simply moving the handling member toward the second position thereof using one finger, such as the thumb, and by moving the closing finger toward the open position thereof using another finger, such as the index finger. This thereby results in quick, easy and ergonomic opening of the carabiner.

According to one embodiment of the invention, the handling member is positioned on the portion of the body of the carabiner opposite the closing finger.

It must be noted that the locking means are separate from the actuating means.

Preferably, the body includes a first hook-shaped branch at least partially delimiting the first basic frame, and the locking means are arranged to cooperate, in the locked position, with the first hook-shaped branch.

Preferably, the body includes a central portion extended at the ends thereof by the first hook-shaped branch and a second branch, respectively, the closing finger being pivotably mounted on the second branch and arranged to cooperate, in the closed position, with the first hook-shaped branch to close the first basic frame.

According to one embodiment of the invention, the handling member is movably mounted on the central portion of the body and is configured so that moving the handling member from the first position toward the second position thereof consists of moving the latter away from the second branch of the body.

Advantageously, the actuating means are mounted on a first portion of the closing finger and the locking means are mounted on a second portion of the closing finger that is different from the first portion.

According to one embodiment of the invention, the actuating means comprise an actuating member movably mounted on the closing finger between at least one first position in which the locking means are in the locked position, and a second position in which the locking means are in the unlocked position, the actuating member being connected to the locking means so that moving the actuating member between the first and second positions thereof causes the locking means to move between the locked and unlocked positions thereof, the actuating member being mounted on the handling member so that moving the handling member between the first and second positions thereof causes the actuating member to move between its first and second positions.

Preferably, the handling member includes a handling portion mounted around the portion of the carabiner body opposite the closing finger, and a mounting portion situated inside the carabiner and on which the actuating member is mounted. Preferably, the handing portion is mounted around the central portion of the body.

The handling portion is preferably in the shape of a stirrup, and the mounting portion preferably comprises two substantially parallel tabs secured to the handling portion and forming a yoke.

According to one embodiment of the invention, the actuating means and the body of the carabiner at least partially delimit a second basic frame separate from the first basic frame and intended to receive a fastening element, such as a tether.

Advantageously, the actuating and handling members are configured to separate the first and second basic frames, and the actuating member is removably mounted on the handling member so that in the mounted position, the actuating and handling members separate the first and second basic frames, and such that in the disassembled position, the actuating and handling members allow communication between the first and second basic frames. These measures make it possible to remove a tether received in the second basic frame outside the carabiner, after disassembling the handling and articulation members and moving the closing finger toward the open position thereof.

Preferably, the actuating member is configured so as to bear against a portion of the carabiner body opposite the closing finger, when it is in the first position thereof.

Advantageously, the actuating member is hingedly mounted on the handling member around a hinge pin.

According to one advantageous feature of the invention, the hinge pin extends substantially parallel to the hinge pin of the closing finger.

Preferably, the hinge pin is movably mounted axially relative to the actuating and handling members between an operating position in which it extends through the actuating and handling members so as to ensure the assembly of the latter parts, and a disassembled position in which it allows the handling and actuating members to be disassembled.

Advantageously, the hinge pin is undetachably mounted on the handling member or the actuating member.

According to one alternative embodiment of the invention, the hinge pin is removably mounted on the handling member or the actuating member.

Preferably, the safety carabiner includes first return means arranged to stress the actuating member toward the first position thereof, and second return means arranged to stress the closing finger toward its closed position.

The first and second return means are advantageously at least partially formed by a torsion spring mounted on the actuating member, the torsion spring including a first branch connected to the locking means and stressing the closing finger toward its closed position, and a second branch stressing the actuating member toward its first position.

According to one advantageous feature of the invention, the hinge pin comprises a peripheral groove in which the second branch of the torsion spring extends. Preferably, the second branch of the torsion spring bears in the bottom of the peripheral groove.

Preferably, the actuating member comprises a lumen emerging at the second branch of the torsion spring, said lumen being arranged to allow the passage of a tool intended to move the second branch of the torsion spring outside the peripheral groove.

According to one embodiment of the invention, the closing finger includes two substantially parallel side portions delimiting a housing in which the actuating member extends at least partially, each side portion of the closing finger comprising a lumen substantially in the shape of an arc of circle centered on the hinge pin of the closing finger, the actuating member comprising first and second protruding portions opposite one another and respectively slidingly mounted in said lumens.

Preferably, the safety carabiner includes at least one locking indicator, advantageously a bright color, provided to indicate whether the closing finger is locked or unlocked.

Advantageously, the closing finger includes a window, and the locking indicator is secured to the locking means and can move between a first position in which the locking indicator is visible through the finger and indicates that the closing finger is locked, and a second position in which the locking indicator is shifted relative to the window and indicates that the closing finger is unlocked.

According to one embodiment of the invention, the locking means comprise a locking finger movably mounted in a housing formed in the closing finger and arranged to cooperate, in the locked position, with a first opening formed in the body of the carabiner. The first opening formed in the body of the carabiner preferably emerges in the second end thereof.

Preferably, the body of the carabiner has a second through opening emerging in the first opening.

According to one embodiment of the invention, the safety carabiner includes blocking means that can move between a position blocking the handling member in the first position thereof, and a position unblocking the handling member allowing the latter to move toward the second position thereof.

Advantageously, the portion of the carabiner body on which the handling member is mounted includes at least one stop, and the blocking means comprise a control button equipped with at least one blocking finger, the control button being movably mounted on the handling member between a blocking position, in which the blocking finger is arranged to cooperate with the stop so as to prevent the handling member from moving toward its second position, and an unblocking position in which the blocking finger is shifted relative to the stop so as to allow the handling member to move toward its second position.

Preferably, the safety carabiner comprises return means arranged to stress the control button toward the blocking position thereof.

According to one embodiment of the invention, the first branch of the body comprises a retaining portion substantially in the shape of a T when seen from the front, and the free end of the pivot finger has a housing with a shape substantially complementary to that of the retaining portion and intended to receive said portion.

Advantageously, the closing finger comprises at least one portion protruding in the housing intended to receive the retaining portion and intended to cooperate with a retaining surface formed on the retaining portion, said at least one portion being arranged to flatten the retaining surface when the load exerted on the carabiner exceeds a predetermined value.

According to one alternative embodiment of the invention, one of the walls delimiting the housing intended to receive the retaining portion is arranged to cooperate with a retaining surface formed on the retaining portion so as to flatten the retaining surface when the load exerted on the carabiner exceeds a predetermined value.

BRIEF DESCRIPTION OF THE DRAWINGS

In any case, the invention will be well understood using the following description, in reference to the appended diagrammatic drawing showing, as one non-limiting example, one embodiment of this safety carabiner.

DETAILED DESCRIPTION

FIGS. 1 to 14 show a safety carabiner 2 that can be used, inter alia, for climbing, speleology, and water sports, such as sailing, or as a safety measure protecting people working at heights from falling.

The safety carabiner 2 comprises a generally C-shaped body 3. The body 3 comprises a substantially rectilinear central portion 3a extended at its ends by a first hook-shaped branch 3b and a second curved branch 3c. The first hook-shaped branch 3b comprises a retaining portion 4 at its free end.

The safety carabiner 2 also comprises a closing finger 5 pivotably mounted around a hinge pin A situated at the free end of the second curved branch 3c, between a closed position in which the closing finger 5 cooperates with the retaining portion 4 of the first hook-shaped branch 3b and an open position in which the closing finger 5 is tilted toward the inside of the carabiner.

The safety carabiner 2 also comprises locking means movably mounted on the closing finger 5 between a locked position in which the locking means cooperate with the first hook-shaped branch 3b, and more particularly with the retaining portion 4, so as to lock the closing finger 5 in the closed position thereof, and an unlocked position in which the closing finger 5 can be moved toward its open position.

Figure 1:
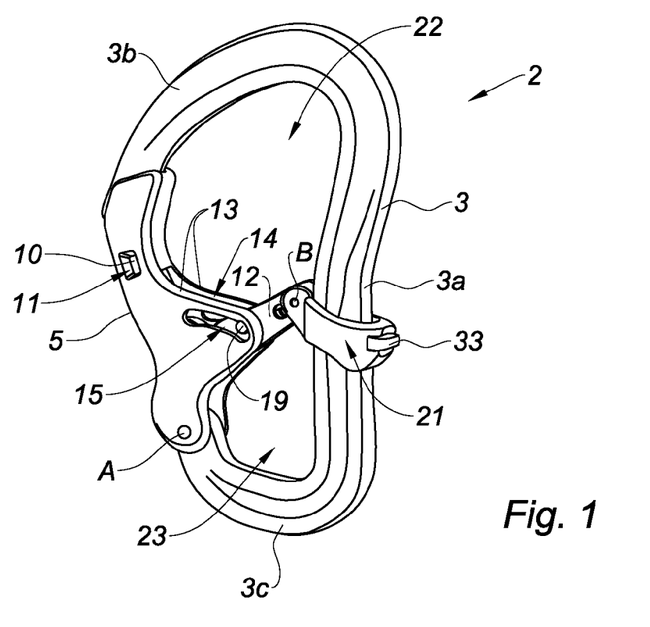
FIG. 1 is a perspective view of the safety carabiner according to the invention showing the closing finger in the closed position.
Figure 2:
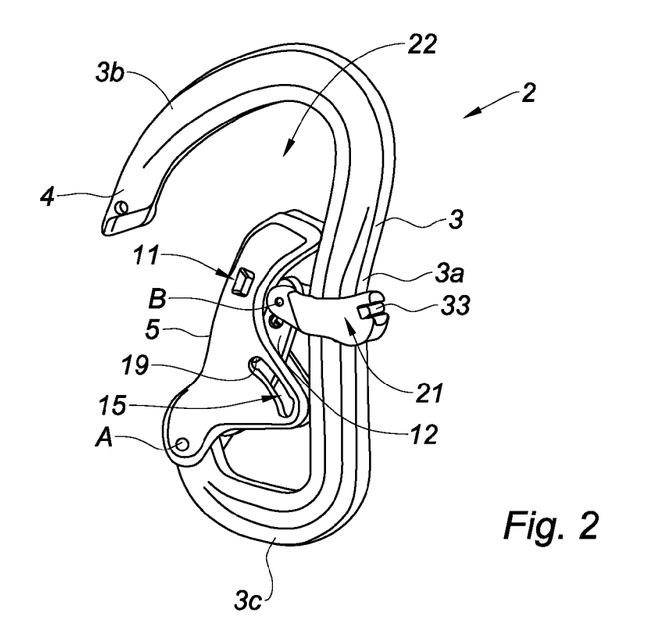
FIG. 2 is a perspective view of the safety carabiner of FIG. 1 showing the closing finger in the open position.
Figures 3, 4:
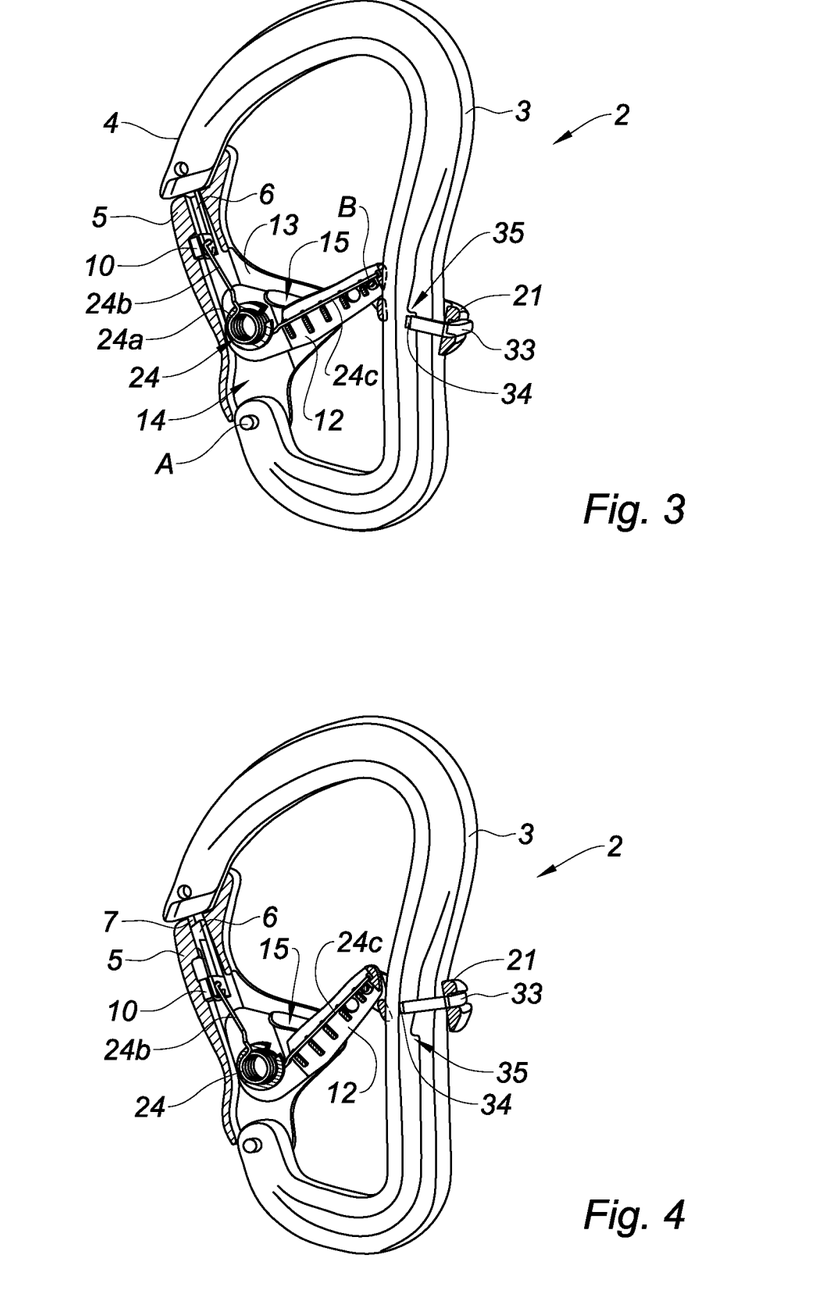
FIG. 3 is a perspective and partial cross-sectional view of the safety carabiner of FIG. 1 showing the closing finger in the closed position.
FIG. 4 is a perspective and partial cross-sectional view of the safety carabiner of the figure showing the locking means in the unlocked position.
Figure 5:
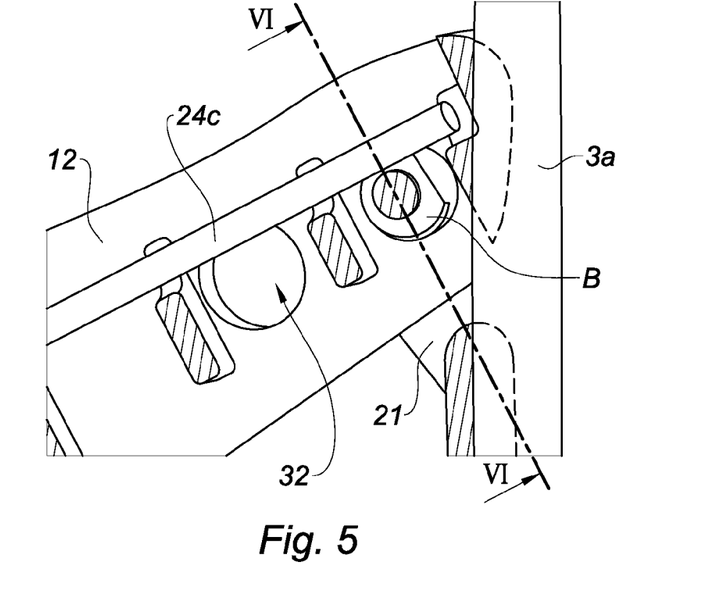
FIG. 5 is an enlarged view of a detail of FIG. 3.

As shown more particularly in FIGS. 3 and 4, the locking means comprise a locking finger 6 movably mounted in a housing 7 formed in the closing finger 5 and emerging in the free end of the closing finger 5. The locking finger 6 is arranged to cooperate, in the locked position, with a first opening 8 (shown in FIG. 10) formed in the retaining portion 4.

The hook-shaped portion 3b advantageously has a second through opening 9 emerging in the first opening 8 so as to prevent an accumulation of dirt inside the first opening 8, and therefore any risk of unwanted blockage of the locking finger 6.

The safety carabiner 2 also includes a locking indicator 10, advantageously a bright color, secured to the locking finger 6 and provided to indicate that the closing finger 5 is locked.

Preferably, the closing finger 5 includes a window 11, and the locking indicator 10 can move between a first position in which it is visible through the window 11 and indicates that the closing finger 5 is locked, and a second position in which it is shifted relative to the window 11, and therefore not visible, and indicates that the closing finger 5 is unlocked.

The safety carabiner 2 also includes actuating means arranged to move the locking means between the locked and unlocked positions thereof.

The actuating means comprise an actuating member 12 connected to the locking finger 6 and movably mounted on the closing finger 5 between at least one first position (shown in FIGS. 1 and 3) in which the locking finger 6 is in the locked position, and a second position (shown in FIGS. 2 and 4) in which the locking finger 6 is in the unlocked position.

The actuating member 12 is configured so as to bear against a part of the central portion 3a turned toward the inside of the carabiner, when it is in its first position.

The closing finger 5 advantageously has two substantially parallel side wings 13 delimiting a housing 14 in which the actuating member 12 extends at least partially. Each side wing 13 of the closing finger 5 comprises a lumen 15 substantially in the shape of an arc of circle 16 centered on the pivot axis A of the closing finger 5.

The actuating member 12 comprises substantially flat first and second surfaces 17, 18 opposite one another, and first and second lugs 19 (only one lug is shown in the figures) respectively formed on the first and second flat surfaces 17, 18 and respectively slidingly mounted in the corresponding lumens 15. The first and second lugs 19 are coaxial and extend substantially parallel to the pivot axis A of the closing finger 5.

The actuating means also include a handling member 21 movably mounted on the central portion 3a of the body of the carabiner, between a first position (shown in FIGS. 1 and 3) and a second position (shown in FIGS. 2 and 4), and in which the actuating member 12 is hingedly mounted around a hinge pin B substantially parallel to the hinge pin A of the closing finger 5.

The handling member 21 includes a first stirrup-shaped portion 21 movably mounted around the central portion 3a of the body of the carabiner, and a mounting portion 21b situated inside the carabiner and comprising two substantially parallel tabs 21c secured to the handling portion 21a. The mounting portion 21b forms a yoke supporting the hinge pin B.

The handling and actuating members 21, 12 are arranged so that moving the handling member 21 between the first and second positions thereof moves the actuating member 12 between its first and second positions, and such that moving the actuating member 12 between the first and second positions thereof moves the locking finger 6 between its locked and unlocked positions.

More particularly, moving the handling member 21 toward its second position causes the hinge pin B to more further away from the central portion 3a, and thus pivots the actuating member relative to the closing finger 5, around its lugs 19.

The body 3, the actuating and handling members 12, 21 and the closing finger 5 delimit a first basic frame 22, accessible after moving the closing finger 5 toward its open position, intended to receive a rope or an anchor point, and a second basic frame 23, separated from the first basic frame 22 by the handling and actuating members, intended to receive a tether.

The safety carabiner also includes a torsion spring 24 mounted on the actuating member 12 and arranged on the one hand to stress the closing finger 5 toward its closed position, and on the other hand to stress the actuating member 12 toward its first position.

The torsion spring 24 is formed by a metal wire wound around itself to form a central loop 24a mounted in a complementary housing delimited by the actuating member 12, the central loop 24a extending through a first branch 24b arranged to stress the closing finger 5 toward its closed position and the free end of which is mounted on the locking finger 6, and by a second branch 24c arranged to stress the actuating member 12 toward its first position.

The hinge pin B is mounted undetachably on the actuating member 12, and is axially movable between an operating position (shown in FIG. 6) in which it extends through the actuating and handling means 12, 21, and a disassembled position (shown in FIG. 7) in which it does not extend through the actuating member 12 and allows the handling and actuating members 12, 21 to be disassembled.

Figure 6:
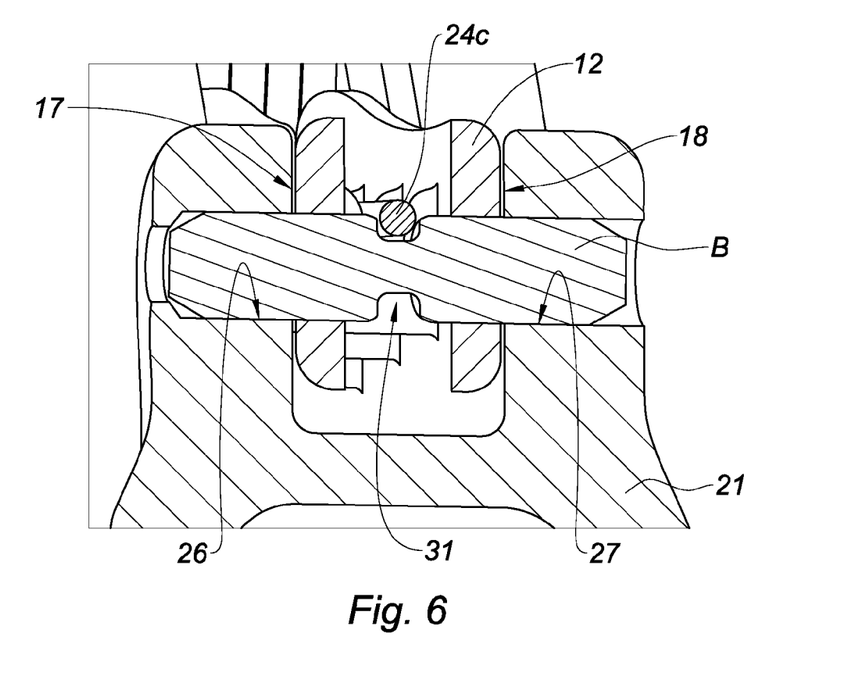
FIG. 6 is a perspective cross-sectional view along line VI-VI of FIG. 5.
Figure 7:
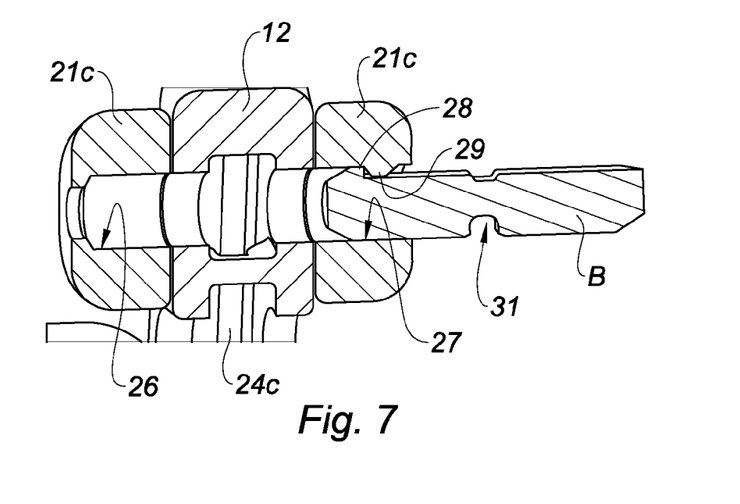
FIG. 7 is a perspective cross-sectional view showing the hinge pin in the disassembled position.
Figures 8, 9:
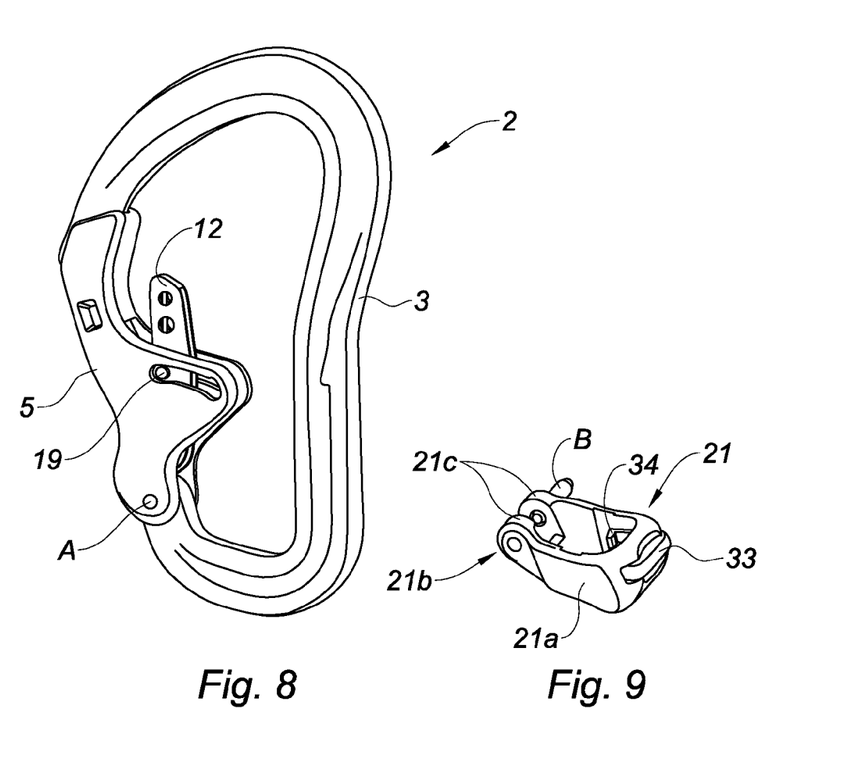
FIG. 8 is a perspective view of the carabiner of FIG. 1 in which the handling member has been removed.
FIG. 9 is a perspective view of the handling member of the carabiner of FIG. 1.

As shown in FIGS. 6 and 7, each tab 21c of the mounting portion 21b comprises an eyelet 26, 27 intended to receive the hinge pin B, the eyelet 26 comprising a portion having a section smaller than the maximum section of the hinge pin B so as to prevent the removal thereof through said eyelet, and the eyelet 27 being configured to allow a partial removal of the hinge pin B through said eyelet.

The undetachable assembly of the hinge pin B is done in particular by providing a shoulder 28 on the hinge pin B close to one of its ends, and a lug 29 protruding in the eyelet 27 and arranged to cooperate with the shoulder 28.

In order to immobilize the hinge pin B in its operating position, the latter comprises a peripheral groove 31 in the bottom of which the second branch 24c of the torsion spring 24 bears.

The actuating member 12 advantageously comprises a lumen 32 emerging at the second branch 24c of the torsion spring 24. The lumen 32 is arranged to allow the passage of a tool intended to move the second branch 24c of the torsion spring 24 outside the peripheral groove 31 so as to allow the hinge pin B to move between the operating and disassembly positions thereof.

The safety carabiner 2 includes blocking means movable between a position blocking the handling member 21 in its first position, and a position unblocking the handling member 21 allowing the latter to move toward its second position.

The blocking means comprise a generally U-shaped control button 33 whereof at least one branch, and preferably each branch, is equipped with a blocking finger 34. The control button 33 is movably mounted on the handling member 21 between a blocking position (shown in FIG. 3), in which the or each blocking finger 34 is arranged to cooperate with a stop 35 formed on the central portion 3a of the body so as to prevent the handling member 21 from moving toward its second position, and an unblocking position (shown in FIG. 4), in which each blocking finger 34 is shifted relative to the corresponding stop 35 so as to allow the handling member 21 to move toward its second position.

According to one embodiment, the control button comprises an elastically deformable portion arranged so as to favor a return of the latter part toward its blocking position.

Figure 10:
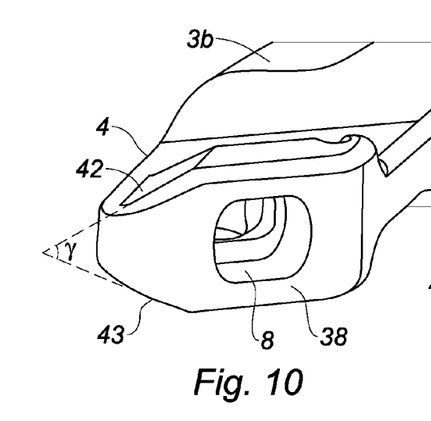
FIGS. 10 and 11 are perspective views of one end of the body of the carabiner of FIG. 1.
Figure 11:
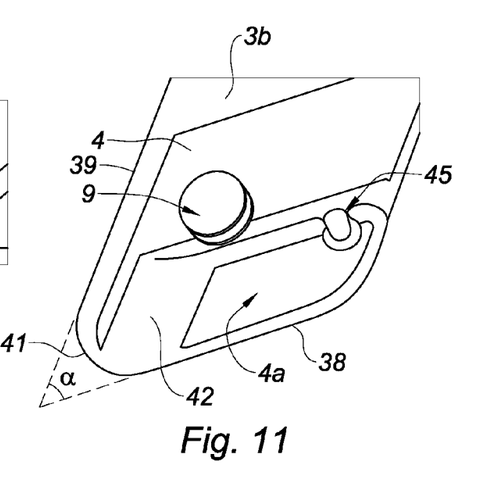
Figure 12:
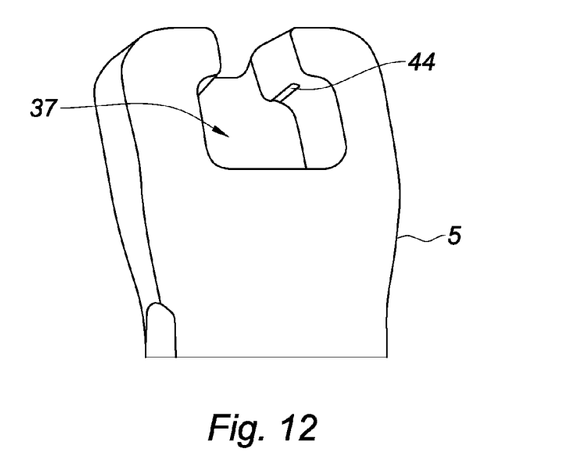
FIG. 12 is a perspective view of the free end of the closing finger of the carabiner of FIG. 1.

As shown in FIGS. 10 and 11, the retaining portion 4 comprises a slender end portion 4a oriented toward the outside of the carabiner. In side view, the carabiner is generally tapered. Furthermore, in front view, the retaining portion 4 is substantially T-shaped. As shown in FIG. 12, the free end of the closing finger 5 has a housing 37 with a shape substantially complementary to that of the retaining portion 4 and intended to receive the latter. These measures in particular make it possible to reinforce the breaking load of the carabiner.

The end portion 4a of the retaining portion 4 is delimited inwardly and outwardly by first and second substantially flat surfaces 38, 39, respectively, converging toward one another and extending substantially parallel to the pivot axis A.

The first and second substantially flat surfaces 38, 39 form an angle $\alpha$ smaller than or equal to 90°, and preferably between 20 and 70°, and advantageously between 30 and 60°.

Figure 13:
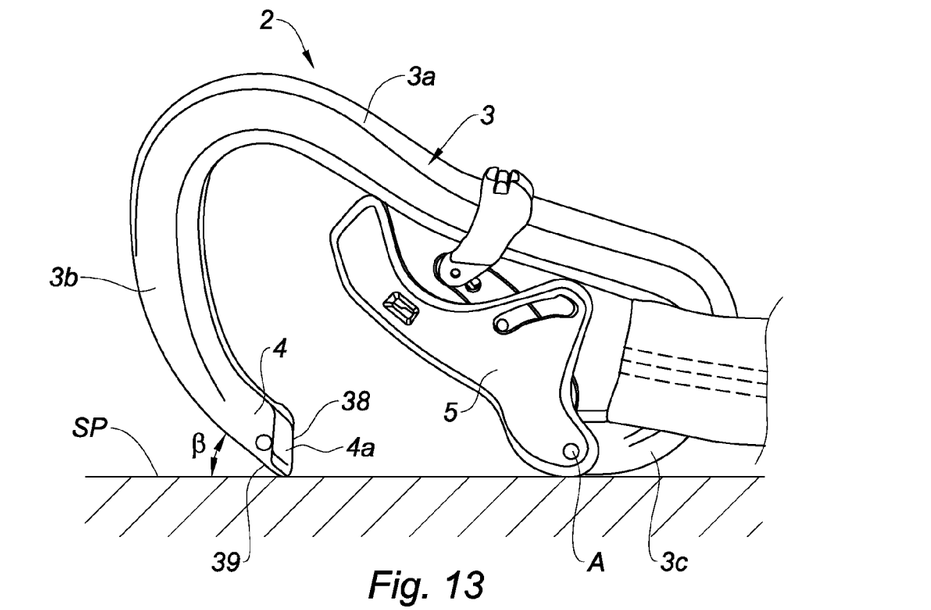
FIG. 13 is a side view of the carabiner of FIG. 1 with the first and second branches of the body bearing on a flat support.
Figure 14:
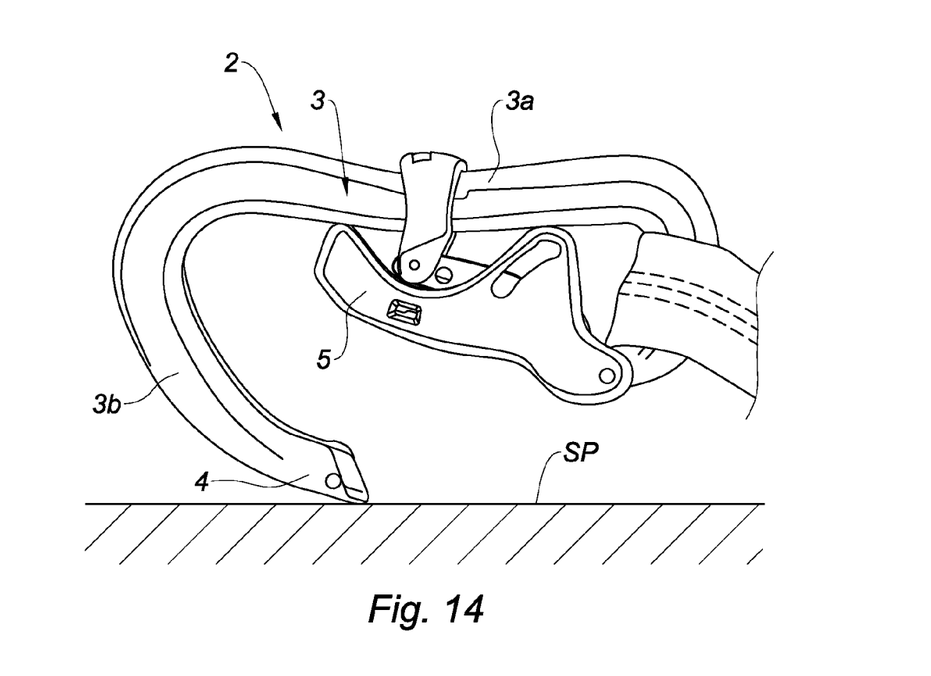
FIG. 14 is a side view of the carabiner of FIG. 1 with the first branch of the body bearing on a flat support and the second branch shifted relative to the flat support.

As shown in FIG. 13, when the safety carabiner extends substantially perpendicular to a flat support SP and the first and second branches 3b, 3c of the body bear on the flat support, the second substantially flat surface 39 and the flat support form an angle $\beta$ smaller than or equal to 90°, preferably between 10 and 80°, and advantageously between 30 and 60°.

The first and second substantially flat surfaces 38, 39 are connected to one another by a rounded intermediate portion 41. The rounded intermediate portion 41 is outwardly delimited by a cylindrical surface portion extending substantially parallel to the hinge pin A and having a curve radius smaller than or equal to 3 mm, and for example approximately 2 mm.

The retaining portion 4 is laterally delimited by at least third and fourth substantially flat surfaces 42, 43 converging toward the free end of the end portion 4a. The third and fourth substantially flat surfaces 42, 43 form an angle $\gamma$ smaller than or equal to 120°, and preferably between 30 and 90°. These measures make it possible to facilitate the attachment of a safety line along a flat surface by laterally tilting the body of the carabiner relative to the flat surface.

It should be noted that the retaining portion 4 is configured so that in the bearing position of the first and second branches of the body on a flat support, the free end of the end portion 4a, i.e. the tip thereof, forms the bearing zone of the first branch 3b on the flat support.

The closing finger 5 advantageously comprises a rib 44 protruding in the housing 37, and the retaining portion 4 comprises a retaining surface 45 intended to cooperate with the rib 44. The rib 44 is arranged to flatten the retaining surface 45 when the load exerted on the carabiner exceeds a predetermined value.

The method for fastening the carabiner 2 on an anchor point will now be described.

The fastening method comprises the following steps:
exerting pressure on the control button 33 so as to move it toward its unblocked position,
moving the handling member 21 toward its second position so as to move the actuating member 12 toward the second position thereof and to move the locking finger 6 toward its unlocked position, exerting pressure on the closing finger 5 so as to move it toward its open position, engaging the hook-shaped portion 3b inside the anchor point, ceasing to exert pressure on the closing finger 5.

When the user stops exerting pressure on the closing finger 5, the first and second branches of the torsion spring 24 respectively stress the closing finger 5 toward its closed position and the actuating member 12 toward its first position. This results in locking the closing finger 5 relative to the body and moving the handling member 21 toward its first position.

The invention is of course not limited solely to the embodiment of this carabiner described above as an example, but on the contrary encompasses all alternative embodiments.

The invention claimed is:

1. A safety carabiner comprising:
   a body at least partially delimiting a first basic frame intended to receive a fastening element,
   a closing finger pivotably mounted on the body around a hinge pin, between a closed position in which the closing finger cooperates with the body so as to close the first basic frame, and an open position in which the closing finger is tilted toward the inside of the carabiner so as to make the first basic frame accessible,
   locking means movably mounted on the closing finger between a locked position in which the locking means cooperate with the body of the carabiner so as to lock the closing finger in its closed position, and an unlocked position in which the closing finger can be moved toward its open position, and
   actuating means arranged to move the locking means between the locked and unlocked positions thereof, the actuating means including a handling member connected to the locking means and movable between a first position on the body in which the locking means are in the locked position and a second position on the body in which the locking means are in the unlocked position, the handling member being arranged so that moving the latter between the first and second positions thereof causes the locking means to move between the locked and unlocked positions thereof,
   wherein the handling member is movably mounted on a portion of the body of the carabiner opposite the closing finger, between the first and second positions thereof,
   wherein the actuating means comprise an actuating member movably mounted on the closing finger between at least one first position in which the locking means are in the locked position, and a second position in which the locking means are in the unlocked position, the actuating member being connected to the locking means so that moving the actuating member between the first and second positions thereof causes the locking means to move between the locked and unlocked positions thereof, the actuating member being mounted on the handling member so that moving the handling member between the first and second positions thereof causes the actuating member to move between its first and second positions,
   wherein the actuating means and the body of the carabiner at least partially delimit a second basic frame separate from the first basic frame and intended to receive a fastening element.

2. The safety carabiner according to claim 1, wherein the handling member includes a handling portion mounted around the portion of the carabiner body opposite the closing finger, and a mounting portion situated inside the carabiner and on which the actuating member is mounted.

3. The safety carabiner according to claim 1, wherein the actuating and handling members are configured to separate the first and second basic frames, and wherein the actuating member is removably mounted on the handling member so that in the mounted position, the actuating and handling members separate the first and second basic frames, and such that in the disassembled position, the actuating and handling members allow communication between the first and second basic frames.

4. The safety carabiner according to claim 1, wherein the actuating member is hingedly mounted on the handling member around a hinge pin.

5. The safety carabiner according to claim 4, wherein the hinge pin is movably mounted axially relative to the actuating and handling members between an operating position in which it extends through the actuating and handling members so as to ensure the assembly of the latter parts, and a disassembled position in which it allows the handling and actuating members to be disassembled.

6. The safety carabiner according to claim 1, wherein it includes first return means arranged to stress the actuating member toward the first position thereof.

7. The safety carabiner according to claim 6, wherein it includes second return means arranged to stress the closing finger toward its closed position.

8. The safety carabiner according to claim 7, wherein the first and second return means are at least partially formed by a torsion spring mounted on the actuating member, the torsion spring including a first branch connected to the locking means and stressing the closing finger toward its closed position, and a second branch stressing the actuating member toward its first position.

9. The safety carabiner according to claim 8, wherein the hinge pin comprises a peripheral groove in which the second branch of the torsion spring extends.

10. The safety carabiner according to claim 1, wherein the closing finger includes two substantially parallel side portions delimiting a housing in which the actuating member extends at least partially, each side portion of the closing finger comprising a lumen substantially in the shape of an arc of circle centered on the hinge pin of the closing finger, the actuating member comprising first and second protruding portions opposite one another and respectively slidingly mounted in said lumens.

11. The safety carabiner according to claim 1, wherein the body includes a first hook-shaped branch at least partially delimiting the first basic frame, and wherein the locking means are arranged to cooperate, in the locked position, with the first hook-shaped branch.

12. The safety carabiner according to claim 1, wherein blocking means that can move between a position blocking the handling member in the first position thereof, and a position unblocking the handling member allowing the latter to move toward the second position thereof.

13. The safety carabiner according to claim 12, wherein the portion of the carabiner body on which the handling member is mounted includes at least one stop, and wherein the blocking means comprise a control button equipped with at least one blocking finger, the control button being movably mounted on the handling member between a blocking position, in which the blocking finger is arranged to cooperate with the stop so as to prevent the handling member from moving toward its second position, and an unblocking position in which the blocking finger is shifted relative to the stop so as to allow the handling member to move toward its second position.

* * * * *